(12) United States Patent
Achan et al.

(10) Patent No.: US 12,026,728 B2
(45) Date of Patent: Jul. 2, 2024

(54) SYSTEMS AND METHODS FOR IDENTIFYING AND USING MICRO-INTENTS

(71) Applicant: Walmart Apollo, LLC, Bentonville, AR (US)

(72) Inventors: Kannan Achan, Saratoga, CA (US);
Abhimanya Mitra, San Jose, CA (US);
Sushant Kumar, Sunnyvale, CA (US);
Evren Korpeoglu, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 535 days.

(21) Appl. No.: 16/531,659

(22) Filed: Aug. 5, 2019

(65) Prior Publication Data

US 2020/0043021 A1 Feb. 6, 2020

Related U.S. Application Data

(60) Provisional application No. 62/715,201, filed on Aug. 6, 2018.

(51) Int. Cl.
*G06Q 30/0201* (2023.01)
*G06F 17/16* (2006.01)
*G06F 18/2321* (2023.01)

(52) U.S. Cl.
CPC ......... *G06Q 30/0201* (2013.01); *G06F 17/16* (2013.01); *G06F 18/2321* (2023.01)

(58) Field of Classification Search
CPC . G06Q 30/0201; G06F 17/16; G06F 18/2321; G06K 9/6221
See application file for complete search history.

(56) References Cited

U.S. PATENT DOCUMENTS 5,835,902 A * 11/1998 Jannarone .............. G06N 3/063
706/26
7,130,814 B1 * 10/2006 Szabo ................ G06Q 30/0201
705/26.8

(Continued)

FOREIGN PATENT DOCUMENTS

WO WO-2012013996 A1 * 2/2012 ....... G06F 17/30864

OTHER PUBLICATIONS

Von Luxburg, Ulrike. "A tutorial on spectral clustering." Statistics and computing 17.4 (2007): 395-416. (Year: 2007).*

(Continued)

*Primary Examiner* — Mehmet Yesildag
*Assistant Examiner* — Thomas Yih Ho
(74) *Attorney, Agent, or Firm* — BRYAN CAVE LEIGHTON PAISNER LLP

(57) ABSTRACT

Systems and methods including one or more processing modules and one or more non-transitory storage modules storing computing instructions configured to run on the one or more processing modules and perform acts of accessing first transaction data stored in a transaction database, the first transaction data describing first transactions for first items from first users; determining, using the first transaction data, first micro-intents associated with the first transaction data; grouping the first micro-intents into clusters; labeling each cluster of the first micro-intents with a respective label; receiving second transaction data of a user, the second transaction data describing second transactions for second items for the user; determining, using the second transaction data, second micro-intents present in the second transactions; receiving current transaction data from a user interface of an electronic device of the user; determining, using the current transaction data, that the user is expressing a current micro-intent, the current micro-intent having at least one (Continued)

associated label; and transmitting an instruction to display, on the user interface of the electronic device, a user interface element correlated with the at least one associated label. Other embodiments are disclosed herein.

20 Claims, 7 Drawing Sheets

(56) References Cited

U.S. PATENT DOCUMENTS

| | | | | |
|---|---|---|---|---|
| 8,401,986 | B1* | 3/2013 | Franke | G06F 16/21 |
| | | | | 706/47 |
| 2002/0032682 | A1* | 3/2002 | Kobayashi | G06F 16/3347 |
| | | | | 707/999.005 |
| 2007/0240059 | A1* | 10/2007 | Ozawa | G06Q 30/00 |
| | | | | 715/716 |
| 2009/0043547 | A1* | 2/2009 | Kirby | G06F 17/175 |
| | | | | 703/2 |
| 2009/0132442 | A1* | 5/2009 | Subramaniam | G06F 40/35 |
| | | | | 706/12 |
| 2010/0049538 | A1* | 2/2010 | Frazer | G06Q 30/0244 |
| | | | | 705/14.43 |
| 2010/0114654 | A1* | 5/2010 | Lukose | G06Q 30/00 |
| | | | | 705/14.54 |
| 2010/0262454 | A1* | 10/2010 | Sommer | G06F 16/355 |
| | | | | 706/55 |
| 2014/0164313 | A1 | 6/2014 | Alboszta et al. | |
| 2014/0258001 | A1* | 9/2014 | Ramaksrihnan | G06Q 30/0276 |
| | | | | 705/14.72 |
| 2015/0081424 | A1* | 3/2015 | Letham | G06Q 30/0276 |
| | | | | 705/14.46 |
| 2015/0189088 | A1* | 7/2015 | Surridge | H04M 3/5233 |
| | | | | 379/265.12 |
| 2018/0053205 | A1* | 2/2018 | Qin | G06Q 30/0277 |
| 2018/0218063 | A1* | 8/2018 | Nag | H04L 67/306 |
| 2018/0294852 | A1 | 10/2018 | Chen et al. | |
| 2020/0034858 | A1* | 1/2020 | Chandra Sekar Rao | |
| | | | | G06N 3/0445 |

OTHER PUBLICATIONS

Benzi, Michele. "Localization in matrix computations: Theory and applications." Exploiting Hidden Structure in Matrix Computations: Algorithms and Applications. Springer, Cham, 2016. 211-317. (Year: 2016).*

Lucińska, Małgorzata, and Sławomir T. Wierzchoń. "Clustering based on eigenvectors of the adjacency matrix." International Journal of Applied Mathematics and Computer Science 28.4 (2018). (Year: 2018).*

Janakiev, Nikolai. "Understanding the Covariance Matrix." DataScience+, Aug. 3, 2018, https://datascienceplus.com/understanding-the-covariance-matrix/. Accessed Dec. 1, 2021. (Year: 2018).*

Sun, Yu, et al. "Collaborative intent prediction with real-time contextual data." ACM Transactions on Information Systems (TOIS) 35.4 (2017): 1-33. (Year: 2017).*

* cited by examiner

SYSTEMS AND METHODS FOR IDENTIFYING AND USING MICRO-INTENTS

CROSS REFERENCE TO RELATED APPLICATIONS

This application claims the benefit of U.S. Provisional Patent Application No. 62/715,201, titled Systems and Methods for Identifying and Using Micro-Intents, filed Aug. 6, 2018, which is herein incorporated by this reference in its entirety.

TECHNICAL FIELD

This disclosure relates generally to data processing and artificial intelligence and more specifically to determination of intents of a user by a computer system.

BACKGROUND

Many individuals in the past have attempted to predict the future actions of humans by attempting to determine their intent. Cues such as body language, facial expressions, tone of voice, and other qualitative measurements have been used in the past to subjectively determine a person's intent. Online interactions do not allow for these qualitative, in person measurements. Accordingly, there is a need for a system and method to determine the intents of individuals over the internet.

BRIEF DESCRIPTION OF THE DRAWINGS

To facilitate further description of the embodiments, the following drawings are provided in which.

Figure 1:
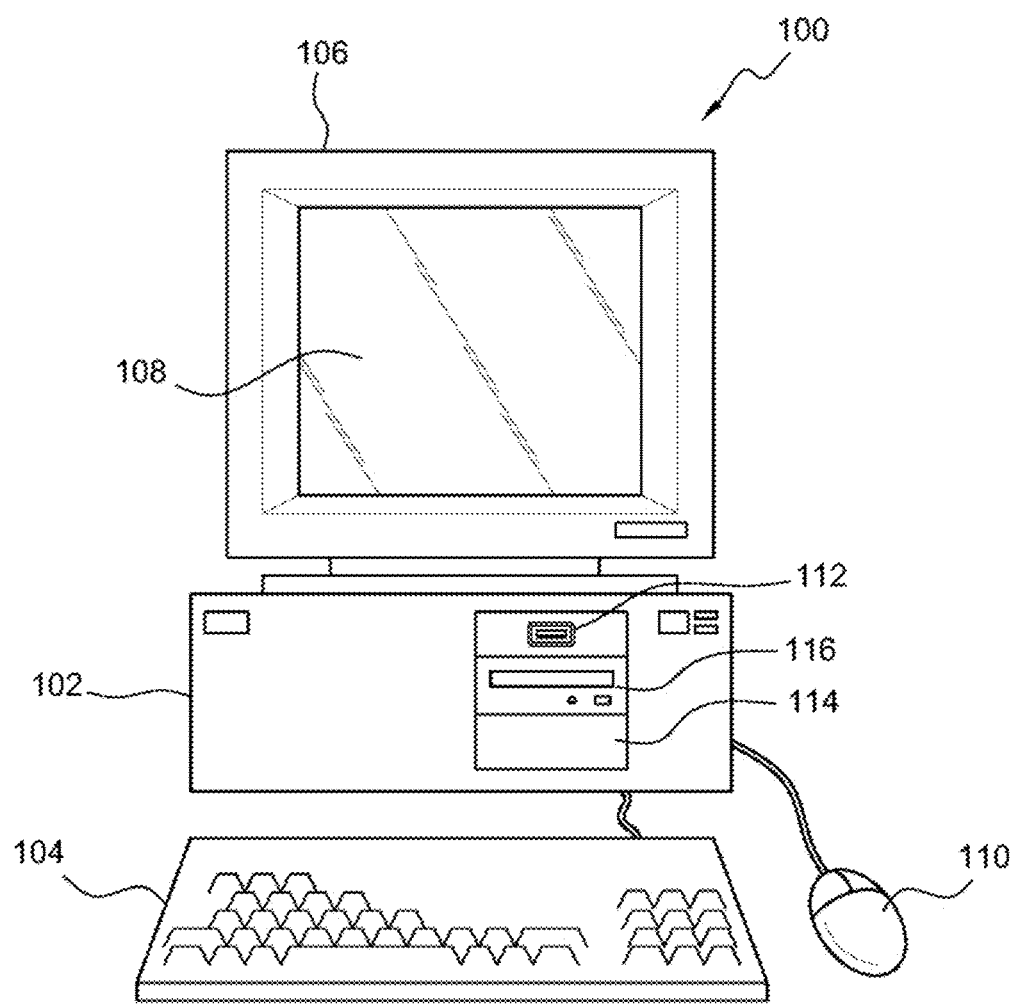
FIG. 1 illustrates a front elevational view of a computer system that is suitable for implementing various embodiments of the systems disclosed in FIGS. 3, 5, and 7.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform acts of accessing first transaction data stored in a transaction database, the first transaction data describing first transactions for first items from first users; determining, using the first transaction data, first micro-intents associated with the first transaction data; grouping the first micro-intents into clusters; labeling each cluster of the first micro-intents with a respective label; receiving second transaction data of a user, the second transaction data describing second transactions for second items for the user; determining, using the second transaction data, second micro-intents present in the second transactions; receiving current transaction data from a user interface of an electronic device of the user; determining, using the current transaction data, that the user is expressing a current micro-intent, the current micro-intent having at least one associated label; and transmitting an instruction to display, on the user interface of the electronic device, a user interface element correlated with the at least one associated label.

Various embodiments include a method. The method can comprise accessing first transaction data stored in a transaction database, the first transaction data describing first transactions for first items from first users; determining, using the first transaction data, first micro-intents associated with the first transaction data; grouping the first micro-intents into clusters; labeling each cluster of the first micro-intents with a respective label; receiving second transaction data of a user, the second transaction data describing second transactions for second items for the user; determining, using the second transaction data, second micro-intents present in the second transactions; receiving current transaction data from a user interface of an electronic device of the user; determining, using the current transaction data, that the user is expressing a current micro-intent, the current micro-intent having at least one associated label; and transmitting an instruction to display, on the user interface of the electronic device, a user interface element correlated with the at least one associated label.

Figure 2:
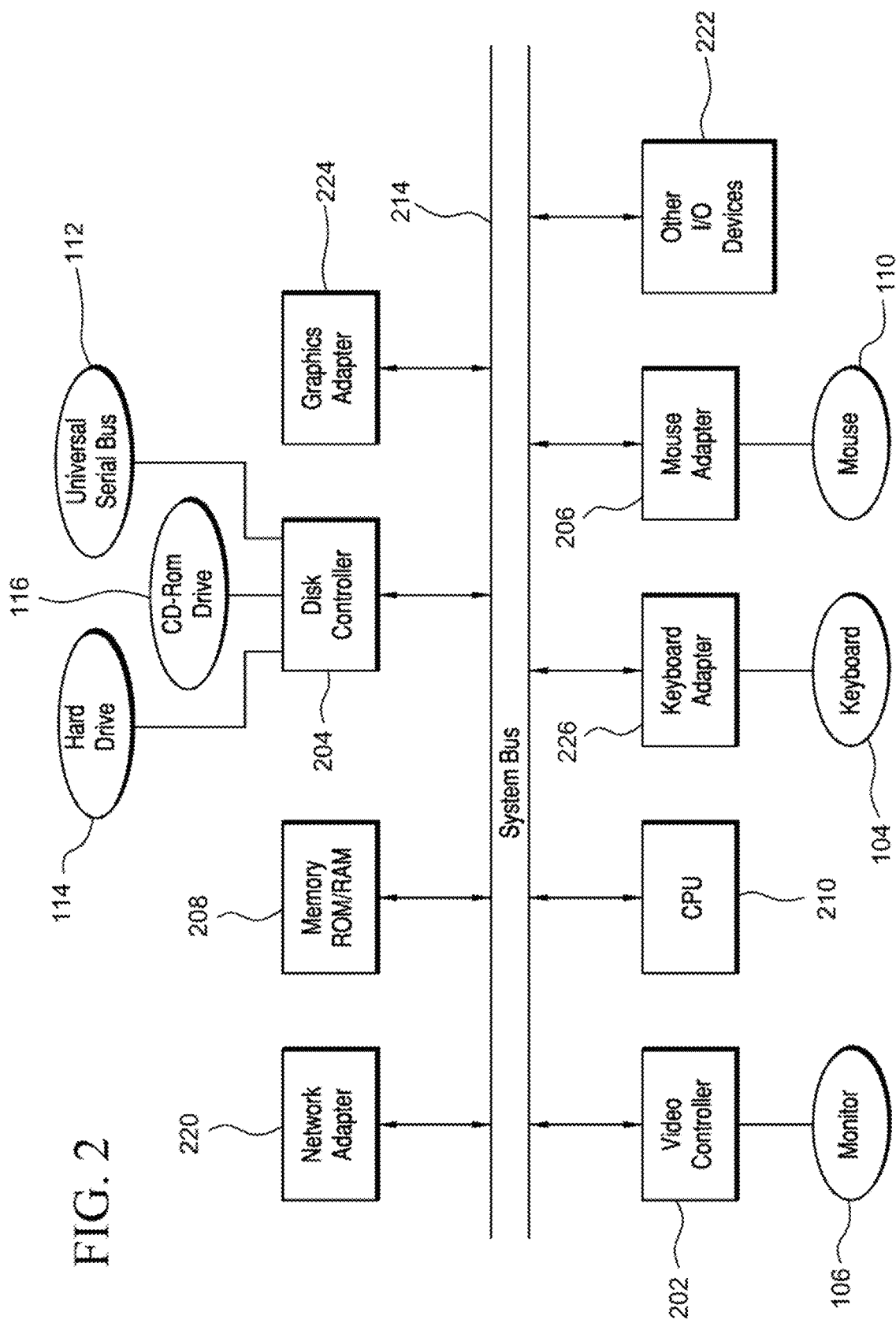
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
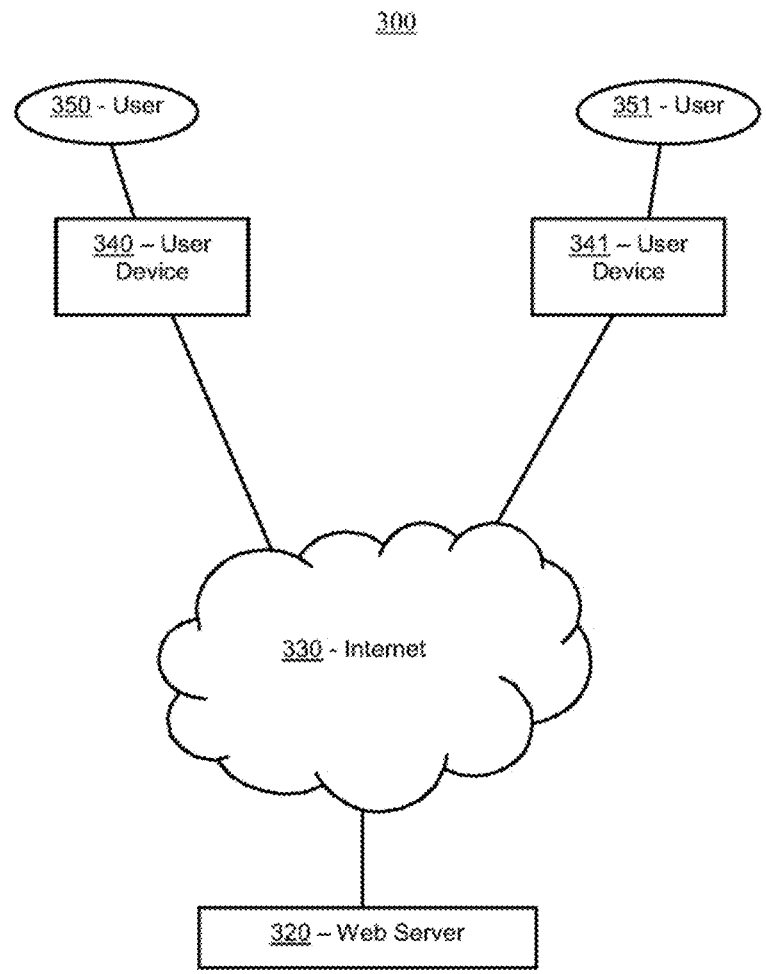
FIG. 3 illustrates a representative block diagram of a system, according to an embodiment.

Turning ahead in the drawings, FIG. 3 illustrates a block diagram of a system 300 that can be employed for determining micro-intents of a user, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include web server 320, Internet 330, user device 340, and/or user device 341. Web server 320, Internet 330, user device 340, and/or user device 341 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 320, Internet 330, user device 340, and/or user device 341. Additional details regarding web server 320, Internet 330, user device 340, and user device 341 are described herein.

In many embodiments, system 300 also can comprise user device 340, 341. User devices 340, 341 can comprise any of the elements described in relation to computer system 100. In some embodiments, user devices 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise a graphical user interface ("GUI"). In the same or different embodiments, a GUI can be part of and/or displayed by user computers 340, 341, which also can be part of system 300. In some embodiments, a GUI can comprise text and/or graphics (image) based user interfaces. In the same or different embodiments, a GUI can comprise a heads up display ("HUD"). When a GUI comprises a HUD, the GUI can be projected onto glass or plastic, displayed in midair as a hologram, or displayed on monitor 106 (FIG. 1). In various embodiments, a GUI can be color or black and white. In many embodiments, a GUI can comprise an application running on a computer system, such as computer system 100, user computers 340, 341, and/or web server 320. In the same or different embodiments, a GUI can comprise a website accessed through internet 330. In some embodiments, a GUI can comprise an eCommerce website. In the same or different embodiments, a GUI can be displayed as or on a virtual reality (VR) and/or augmented reality (AR) system or display.

In some embodiments, web server 320 can be in data communication through Internet 330 with user computers (e.g., 340, 341). In certain embodiments, user devices 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, web server 320, Internet 330, user device 340 and/or user device 341 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) web server 320, Internet 330, user device 340 and/or user device 341 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module (s) and/or the memory storage module(s). In some embodiments, the KVM switch also can be part of web server 320, Internet 330, user device 340 and/or user device 341. In a similar manner, the processing module(s) and the memory storage module(s) can be local and/or remote to each other.

In many embodiments, web server 320, Internet 330, user device 340 and/or user device 341 can be configured to communicate with one or more user devices 340 and 341. In some embodiments, user devices 340 and 341 also can be referred to as customer computers or customer devices. In some embodiments, web server 320, user device 340 and/or user device 341 can communicate or interface (e.g., interact) with one or more customer computers through a network or internet 330. Internet 330 can be an intranet that is not open to the public. Accordingly, in many embodiments, web server 320, user device 340 and/or user device 341 (and/or the software used by such systems) can refer to a back end of system 300 operated by an operator and/or administrator of system 300, and the customer computers (and/or the software used by such systems) can refer to a front end of system 300 used by one or more customers, respectively. In some embodiments, the customer computers can be similar to user devices 340 and 341 and can be coupled to web server 320 via internet 330 when internet 330 is not a private intranet. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 320, user device 340 and/or user device 341 can also be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between web server 320, user device 340, user device 341, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

For convenience, the functionality of system 300 is described herein as it relates particularly to user device 340 and a single user. But in many embodiments, the functionality of system 300 can be extended to each of user systems 340, 341 and/or to multiple users. In these extended examples, in some embodiments, single users can interface (e.g., interact) with web server 320 with multiple user devices 340, 341 (e.g., at different times) via Internet 330. In the same or different example, a user could interface with web server 320 via a first user computer system (e.g., a desktop computer), such as, for example, when interfacing with web server 320 from home during a first time period, and via a second user computer system (e.g., a mobile device), such as, for example, when interfacing with web server 320 away from home during a second time period.

Knowing the intent of a person can provide many benefits. Not only can it allow one to make accurate predictions about future behavior, but this information also can be used to influence or nudge a person towards a desired course of action. Determining the intent of a person over the internet or another computer network, though, produces a multitude of problems unique to the internet and computer systems. For example, interactions over the internet are shrouded in uncertainty. The lack of non-verbal cues, such as body language and tone of voice, are lost when humans are not speaking face-to-face. Further, when deducing the intent of a person, these types of non-verbal cues are scrutinized qualitatively by humans, and there is no good computer analogue for these qualitative determinations. In addition, many intents are so small or minor that the person expressing them does not know that the intent is present in their actions. One solution to these problems posed by determining intents over the internet is to model these intents as latent variables.

Due to this disclosed solution to internet and/or computer centric problems, the techniques described herein can provide several practical applications and technological improvements. In some embodiments, the techniques described herein can provide for an improved understanding of human intents by a computer system or over a computer network. These techniques described herein can provide a significant improvement over conventional approaches, such as assuming an intent without taking into account historical behavior. Moreover, these estimates are improvements over other possible approaches, such as estimating the wait time based on an average of wait times during the previous day. In many embodiments, the techniques described herein can beneficially make determinations based on dynamic information that describes current conditions and/or conditions that have occurred during the same day of the scheduled pickup.

In a number of embodiments, the techniques described herein can advantageously provide improved usability of a computer system by an end user (e.g., users 350, 351) by changing content displayed on a GUI to better align with a determined intent of the end user. In various embodiments, the techniques described herein can dynamically determine a user intent in real time with limited historical data, as described in further detail below. This determination, in turn, can allow a computer system to infer an intent of a user, and improve the function of the computer system accordingly.

In many embodiments, the techniques described herein can be used continuously at a scale that cannot be reasonably performed using manual techniques or the human mind. For example, the amount of historical data used in the below described system and/or method is too large for a human to practically analyze before an intent of a user changes.

In many embodiments, the techniques described herein can provide several technological improvements. Specifically, the techniques described herein provide for the ability to infer micro-intents of a user over a computer network. This approach is different from previous approaches, which applied subjective human manual determinations of body language, intonation, and other qualitative measurements. Further, by performing subsequent analysis on micro-intents instead of performing it on large data sets, processing burdens on a processor can be reduced and processing times can be improved.

Figure 4:
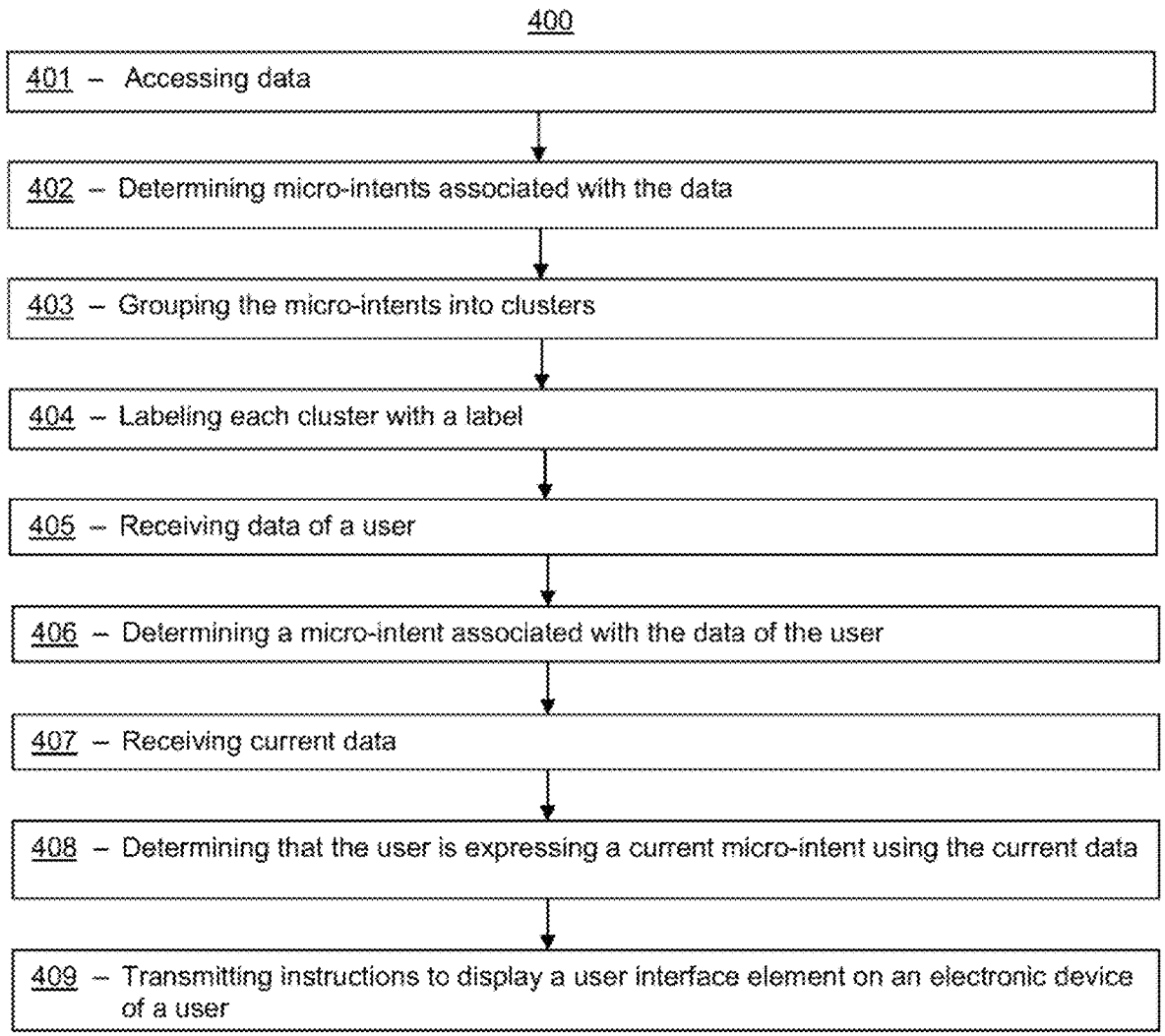
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as user device 340, user device 341, and/or web server 320 (FIG. 3). The processing module(s) can be similar or identical to the processing module(s) described above with respect to computer system 100 (FIG. 1).

In many embodiments, method 400 can comprise an activity 401 of accessing data. In some embodiments, data is stored in a structured format, such as a relational database and/or graph database. In further embodiments, data is stored in an unstructured format. When data is stored in an unstructured or structured format, it can be ordered chronologically by either manually ordering data or using one or more sorting algorithms known in the art to chronologically order data. In the same or different embodiments, data can be grouped into data sets, and data sets can then be ordered chronologically. In some embodiments, data can be transaction data gathered from sales of an e-commerce retailer on an e-commerce website and/or a brick and mortar store. In various embodiments, data sets can be sets of transactions. In the same or different embodiments, data can be clicks and/or views of webpages on an internet, and data sets can be a set of pages clicked and/or viewed. In some embodiments, data can be clicks and/or views of items on an e-commerce website, and data sets can be a set of items clicked and/or viewed. In some embodiments, data can be gathered from one source, such as a transaction history of one user. In many embodiments, data can be aggregated from multiple sources, such as a transaction history of multiple users.

In some embodiments, activity 401 can comprise using a distributed network comprising distributed memory architecture to gather, store, and/or order data. This distributed architecture can reduce the impact on the network and system resources to reduce congestion in bottlenecks while still allowing data to be accessible from a central location.

Figure 6:
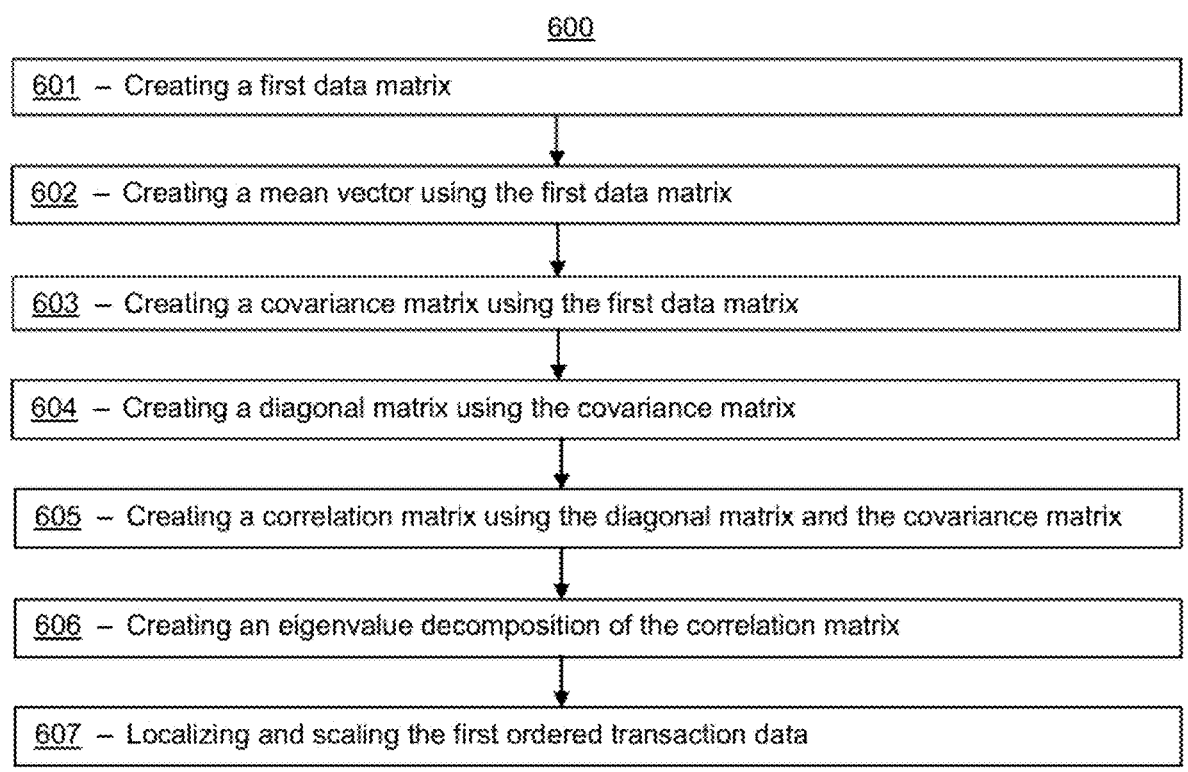
FIG. 6 illustrates a flowchart for a method, according to certain embodiments.

In many embodiments, method 400 can comprise an activity 402 of determining a plurality of micro-intents associated with data. In some embodiments, activity 402 can further comprise all or a portion of method 600 (FIG. 6). In various embodiments, micro-intents can be determined for each set of data in the data. In the same or different embodiments, micro-intents can be determined for the data as a whole. In some embodiments, activity 402 can comprise using a distributed network comprising distributed processing architecture to determine a plurality of micro-intents. This distributed architecture can reduce the impact on the network and system resources to reduce congestion in bottlenecks while still allowing computationally intensive calculations to be performed quickly.

In many embodiments, method 400 can comprise an activity 403 of grouping the plurality of micro-intents into clusters. In some embodiments, data is grouped into clusters to compare similar micro-intents that have differing values. In the same or different embodiments, the micro-intents are grouped into cluster using the following equation:

$$\{x : (x - \overline{X}) D^{-1/2} Q_{\cdot j} \in (v_1, v_2]\}$$

In various embodiments, x can comprise a matrix of data entries, $\overline{X}$ can comprise a mean vector, $D^{-1/2}$ can comprise a diagonal matrix, $Q_{\cdot j}$ can comprise an eigenvector, $v_1$ can comprise a $25^{th}$ percentile of transformed vectors, and/or $v_2$ can comprise a median of transformed vectors. In many embodiments, $D^{1/2}$ can comprise a diagonal of variances of columns of X In some embodiments, $Q_{\cdot j}$ can comprise a j-th eigenvector of a correlation matrix formed from X, as described below. In the same or different embodiments, $v_1$ can comprise a 25th percentile of data values, a 25th percentile of data sets, and/or a $25^{th}$ percentile of transformed variables. In many embodiments, $v_2$ can comprise a 50th percentile of transformed vectors, a 50th percentile of data values, a 50th percentile of data sets, and/or a 50th percentile of transformed variables. In various embodiments, activity 403 can comprise using a distributed network comprising distributed processing architecture to group a plurality of micro-intents into clusters. This distributed architecture can reduce the impact on the network and system resources to reduce congestion in bottlenecks while still allowing data to be accessible from a central location.

In many embodiments, method 400 can comprise an activity 404 of labeling each cluster with a label. In various embodiments, activity 404 can comprise restricting a cluster to top priority data values with respect to $Q_{\cdot j}$. As an example, top priority data values can be data values that more strongly show a micro-intent. In the same or different embodiments, a cluster can be restricted by choosing data values k from the set of $\{k:|Q_{k,j}|>90\text{th percentile of }\{|Q_{l,j}|\}\}$, where l comprises the number of data values. In many embodiments, l can comprise an index of data values. In some embodiments, data values can comprise items sold by an e-commerce retailer on an e-commerce website. In the same or different embodiments, clusters are labeled with labels corresponding to the contents of the cluster. For example, if a cluster contains different food items, it can be labeled "grocery." In some embodiments, no data values remain after restricting a cluster, and such a cluster is labeled "none." In further embodiments, a cluster labeled "none" is excluded from other activities in method 400.

In some embodiments, activity 404 and other activities in method 400 can comprise using a distributed network comprising distributed processing architecture to label clusters. This distributed architecture can reduce the impact on the network and system resources to reduce congestion in bottlenecks while still allowing data to be accessible from a central location.

In many embodiments, activity 404 can further comprise determining a label pattern for a user. In some embodiments, a label pattern can comprise a sticky preference, a new interest, and/or an evolving preference. In various embodiments, a sticky preference can comprise a label that reoccurs in a history of a user. In the same or different embodiments, a new interest can comprise a label that is newly occurring in a current data set of a user. In some embodiments, an evolving preference can comprise a label that is occurring with increased or decreased regularity in a history of a user.

In many embodiments, method 400 can comprise an activity 405 of receiving data of a user. In some embodiments, data of a user is stored in a structured format, such as a relational database and/or graph database. In further embodiments, data of a user is stored in an unstructured format. When data of a user is stored in an unstructured or structured format, it can be ordered chronologically by either manually ordering data or using one or more sorting algorithms known in the art to chronologically order data of a user. In the same or different embodiments, data of a user can be grouped into data sets, and data sets can then be ordered chronologically. In some embodiments, data of a user can be transaction data gathered from sales of an e-commerce retailer on an e-commerce website and/or a brick and mortar store. In various embodiments, data sets can be sets of transactions. In the same or different embodiments, data of a user can be clicks and/or views of webpages on an internet, and data sets can be a set of pages clicked and/or viewed by a user. In some embodiments, data of a user can be clicks and/or views of items on an e-commerce website, and data sets can be a set of items clicked and/or viewed by a user. In some embodiments, activity 405 and other activities in method 400 can comprise using a distributed network comprising distributed memory architecture to receive the data of a user. This distributed architecture can reduce the impact on the network and system resources to reduce congestion in bottlenecks while still allowing data to be accessible from a central location.

In many embodiments, method 400 can comprise an activity 406 of determining a micro-intent associated with data of a user. In some embodiments, activity 406 can further comprise all or a portion of method 600 (FIG. 6). In various embodiments, a micro-intent of a user can be determined for each set of data in data of the user. In the same or different embodiments, micro-intents can be determined for data as a whole. In some embodiments, activity 402 can comprise using a distributed network comprising distributed processing architecture to determine a plurality of micro-intents. This distributed architecture can reduce the impact on the network and system resources to reduce congestion in bottlenecks while still allowing computationally intensive calculations to be performed quickly. In some embodiments, activity 406 and other activities in method 400 can comprise using a distributed network comprising distributed processing architecture to determine a micro-intent associated with data of a user. This distributed architecture can reduce the impact on the network and system resources to reduce congestion in bottlenecks while still allowing data to be accessible from a central location.

In many embodiments, method 400 can comprise an activity 407 of receiving current data. In some embodiments, current data is received in a structured format, such as a relational database and/or graph database. In further embodiments, current data is received in an unstructured format. In the same or different embodiments, current data can be grouped into data sets. In some embodiments, current data can be current transaction data gathered from an electronic shopping cart of a user on an e-commerce website, and data sets can be items currently present in the electronic shopping cart of a user. In the same or different embodiments, current data can be clicks and/or views of webpages on the internet, and data sets can be the set of webpages clicked and/or viewed by a user in a current browsing session. In some embodiments, current data can be clicks and/or views of items for sale on an e-commerce website, and data sets can be a set of items clicked and/or viewed by a user in a current browsing section. In various embodiments, current data. In some embodiments, activity 407 can comprise using a distributed network comprising distributed memory architecture to receive current data. This distributed architecture can reduce the impact on the network and system resources to reduce congestion in bottlenecks while still allowing data to be accessible from a central location.

In many embodiments, method 400 can comprise an activity 408 of determining that a user is expressing a current micro-intent using current data. In some embodiments, activity 408 can further comprise all or a portion of method 600 (FIG. 6). In other embodiments, activity 408 can further comprise all or a portion of activities 403 and 404. In some embodiments, activity 408 can comprise using a distributed network comprising distributed processing architecture to determine that a user is expressing a current micro-intent. This distributed architecture can reduce the impact on the network and system resources to reduce congestion in bottlenecks while still allowing data to be accessible from a central location.

In the same or different embodiments, when a label is found in the top m micro-intents of at least k data sets (m and k configurable by an administrator), methods of estimating personal replenishment cycles found in U.S. Provisional Patent Application No. 62/553,673, which is herein incorporated by reference in its entirety, can be applied to capture a periodicity of the micro-intent. As stated above, processing times and burdens on the processor for estimating personal replenishment cycles can be improved by performing these calculations using micro-intents instead of raw data sets. In some embodiments, when a new label is found in the top m micro-intents of less than k data sets, the new label is considered a top label for a user when $f(l) \geq f$, where:

$$f(l) = \max_{i=1,2,\ldots n} \frac{g(i, l)}{i};$$

g(i,l)=the number of times a label l is among the top m micro-intents in the latest i transactions; and the parameters n∈ℕ, m∈ℕ, and 0<f≤1 are configurable by an administrator. In various embodiments, top m micro-intents can comprise micro-intents associated with the ordered data of a user. In many embodiments, k data sets can comprise data of a user.

In many embodiments, activity 408 can comprise ranking labels of micro-intents expressed by a user. In various embodiments, a label present in the current data set can be ranked highest, historical labels for a user ordered by hazard rate can be ranked second highest, and any newly discovered labels can be ranked third highest. As an example, a hazard rate for a micro-intent can be a likelihood of an appearance of a micro-intent in a transaction based upon time since its last appearance. In some embodiments, any newly discovered labels can be ranked second highest, and historical labels for a user ordered by hazard rate can be ranked third highest. In further embodiments, rankings can be alternated between historical labels and new labels. For example, a label present in the current data set can be ranked first, a historical label for a user ordered first by hazard rate can be ranked second, a newly discovered micro-intent can be ranked third, a historical label for a user ordered second by hazard rate can be ranked fourth, a newly discovered micro-intent can be ranked fifth, etc.

In many embodiments, method 400 can comprise an activity 409 of transmitting instructions to display a user interface element on an electronic device of a user. In some embodiments, a user interface element can be a product promotion such as an advertisement for the product on a website and/or such as a coupon or other discount for the product. In the same or different embodiments, a website can be an e-commerce website of an e-commerce retailer. In various embodiments, the user interface element can describe popular products with a label of a currently expressed micro-intent that are not in the electronic shopping card of a user. In the same or different embodiments, the popular products with a label of a currently expressed micro-intent that are not in the electronic shopping card of a user are the most popular products. In further embodiments, a user interface element can be related to a micro-intent expressed in the current data or a top priority micro-intent expressed in the current data, such as: the top m micro-intents of at least k data sets as described above or the highest ranked p labels for the data set (p being configurable). As stated above, processing times and burdens on the processor for displaying a user interface element can be improved by performing these calculations using micro-intents instead of raw data sets.

Figure 5:
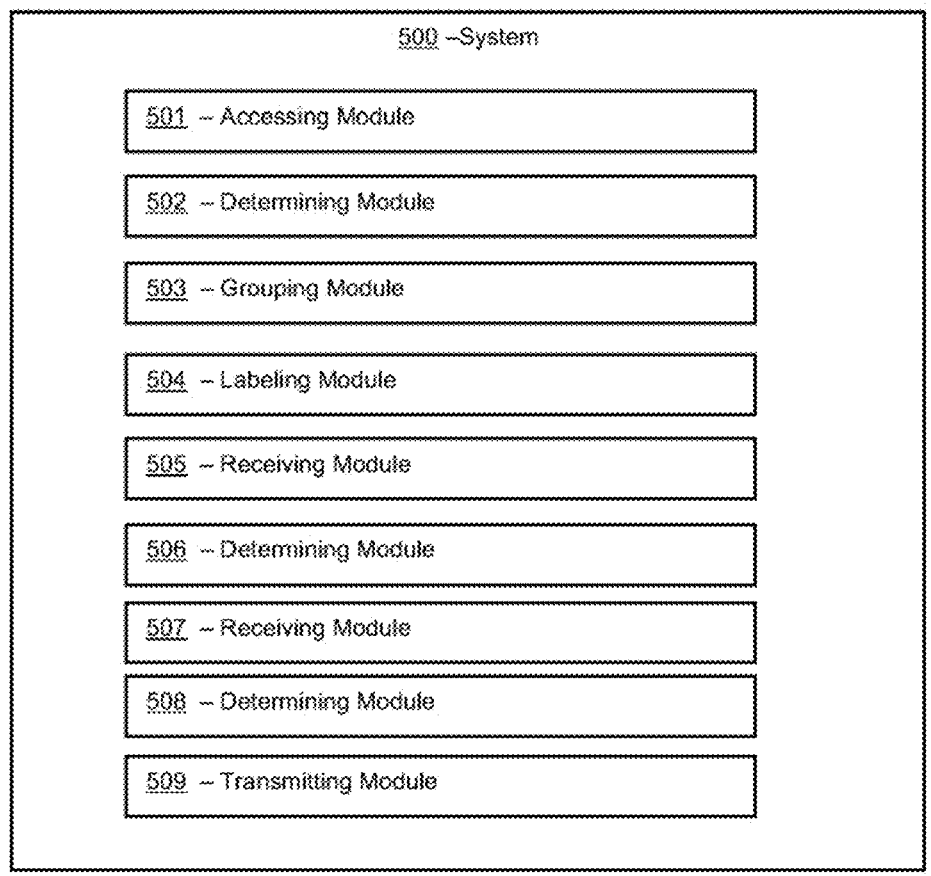
FIG. 5 illustrates a representative block diagram of a system, according to certain embodiments.

Turning ahead in the figures, FIG. 5 illustrates a block diagram of a system 500 that can perform disclosed embodiments. System 500 is merely exemplary and is not limited to the embodiments presented herein. System 500 can be employed in many different embodiments or examples not specifically depicted or described herein. In some embodiments, certain elements or modules of system 500 can perform various procedures, processes, and/or acts. In other embodiments, the procedures, processes, and/or acts can be performed by other suitable elements or modules.

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise module 501. Module 501 can be referred to as accessing module 501. In many embodiments, accessing module 501 can store computing instructions configured to run on one or more processing modules and perform one or more acts of method 400 (FIG. 4) (e.g., activity 401 of accessing transaction data (FIG. 4)).

In many embodiments, system 500 can comprise module 502. Module 502 can be referred to as determining module 502. In many embodiments, determining module 502 can store computing instructions configured to run on one or more processing modules and perform one or more acts of method 400 (FIG. 4) (e.g., activity 402 of determining a plurality of micro-intents associated with the ordered transaction data (FIG. 4)).

In many embodiments, system 500 can comprise module 503. Module 503 can be referred to as grouping module 503. In many embodiments, grouping module 503 can store computing instructions configured to run on one or more processing modules and perform one or more acts of method 400 (FIG. 4) (e.g., activity 403 of grouping the plurality of micro-intents into clusters (FIG. 4)).

In many embodiments, system 500 can comprise module 504. Module 504 can be referred to as labeling module 504. In many embodiments, labeling module 504 can store computing instructions configured to run on one or more processing modules and perform one or more acts of method 400 (FIG. 4) (e.g., activity 404 of labeling each cluster with a label (FIG. 4)).

In many embodiments, system 500 can comprise module 505. Module 505 can be referred to as receiving module 505. In many embodiments, receiving module 505 can store computing instructions configured to run on one or more processing modules and perform one or more acts of method 400 (FIG. 4) (e.g., activity 505 of receiving transaction data of a user (FIG. 4)).

In many embodiments, system 500 can comprise module 506. Module 506 can be referred to as determining module 506. In many embodiments, determining module 506 can store computing instructions configured to run on one or more processing modules and perform one or more acts of method 400 (FIG. 4) (e.g., activity 406 of determining a micro-intent associated with the ordered transaction data of the user (FIG. 4)).

In many embodiments, system 500 can comprise module 507. Module 507 can be referred to as receiving module 507. In many embodiments, receiving module 507 can store computing instructions configured to run on one or more processing modules and perform one or more acts of method 400 (FIG. 4) (e.g., activity 407 of receiving current transaction data (FIG. 4)).

In many embodiments, system 500 can comprise module 508. Module 508 can be referred to as determining module 508. In many embodiments, determining module 508 can store computing instructions configured to run on one or more processing modules and perform one or more acts of method 400 (FIG. 4) (e.g., activity 408 of determining that the user is expressing a current micro-intent using the current transaction data (FIG. 4)).

In many embodiments, system 500 can comprise module 509. Module 509 can be referred to as transmitting module 509. In many embodiments, transmitting module 509 can store computing instructions configured to run on one or more processing modules and perform one or more acts of method 400 (FIG. 4) (e.g., activity 409 of transmitting instructions to display a user interface element on an electronic device f a user (FIG. 4)).

Turning ahead in the drawings, FIG. 6 illustrates a flow chart for a method 600 for determining micro-intents, according to an embodiment. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. For example, in some embodiments, method 600 can be used to determine the micro-intents described in activities 402, 404, and/or 408 (FIG. 4). In still other embodiments, one or more of the activities of method 600 can be combined or skipped. In many embodiments, system 300 (FIG. 3) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules. Such non-transitory memory storage modules can be part of a computer system such as user device 340, user device 341, and/or web server 320 (FIG. 3). The processing module(s) can be similar or identical to the processing module(s) described above with respect to computer system 100 (FIG. 1).

In many embodiments, method 600 can comprise an activity 601 of creating a first data matrix. In some embodiments, a data matrix can comprise a transaction data matrix storing transaction data gathered from sales of an e-commerce retailer on an e-commerce website. In the same or different embodiments, rows of a transaction data matrix correspond to transactions, and columns of a transaction data matrix correspond to items. In further embodiments, entries in a transaction data matrix can be defined as:

$$X_{i,j} = \begin{cases} 1 \\ 0 \end{cases} \text{ when the } j\text{-}th \text{ item is present in the } i\text{-}th \text{ transaction.}$$

In some embodiments, activity 601 and other activities in method 600 can comprise using a distributed network comprising distributed processor architecture to create a transaction matrix. This distributed architecture can reduce the impact on the network and system resources to reduce congestion in bottlenecks while still allowing data to be accessible from a central location.

In many embodiments, method 600 can comprise an activity 602 of creating a mean vector using the first data matrix. In some embodiments, a mean vector can be defined as:

$$\overline{X}_J = \frac{\text{number of transactions with item } j \text{ present in the transaction}}{\text{total numnber of transactions in the transaction matrix}}$$

In some embodiments, activity 602 and other activities in method 600 can comprise using a distributed network comprising distributed processor architecture to create a mean vector. This distributed architecture can reduce the impact on the network and system resources to reduce congestion in bottlenecks while still allowing data to be accessible from a central location.

In many embodiments, method 600 can comprise an activity 603 of creating a covariance matrix using a data matrix. In some embodiments, the covariance matrix can be defined as $$\Sigma = \frac{1}{N} X^T X - \overline{X}^T \overline{X},$$

where N is a number of transactions in a first transaction data matrix, $X^T$ comprises a transpose of a transaction matrix X and $\overline{X}^T$ comprises a transpose of a covariance matrix $\overline{X}$.

In some embodiments, activity 603 and other activities in method 600 can comprise using a distributed network comprising distributed processor architecture to create a covariance matrix. This distributed architecture can reduce the impact on the network and system resources to reduce congestion in bottlenecks while still allowing data to be accessible from a central location.

In many embodiments, method 600 can comprise an activity 604 of creating a correlation matrix using the diagonal matrix and the covariance matrix. In some embodiments, a correlation matrix can be defined as: $R=D^{-1/2}\Sigma D^{-1/2}$, where D is a diagonal matrix with entries equal to a covariance matrix $\Sigma$ (i.e. $D_{j,j}=\Sigma_{j,j}$) and $D^{-1/2}$ is a diagonal matrix having diagonal entries defined as $$(D^{-1/2})_{j,j} = \frac{1}{\sqrt{D_{j,j}}}.$$

In some embodiments, activity 604 and other activities in method 600 can comprise using a distributed network comprising distributed memory architecture to create a correlation matrix. This distributed architecture can reduce the impact on the network and system resources to reduce congestion in bottlenecks while still allowing data to be accessible from a central location.

In many embodiments, method 600 can comprise an activity 605 of creating an eigenvalue decomposition of a correlation matrix. In some embodiments, eigenvalue decompositions of a correlation matrix can be treated as latent variables that explain the associations of the pairs of data entries in the data matrix. In this way, eigenvalues of a correlation matrix as described herein can be used to define the intent associated with a data set. In the same or different embodiments, a correlation matrix R can be decomposed as: $R=Q\Lambda Q^T$, where $Q^TQ=I$, Q is an orthogonal matrix, $Q^T$ is a transpose of Q, I is an identity matrix, and $\Lambda$ is a diagonal matrix of non-zero eigenvalues of R. In various embodiments, Q further comprises $j^{th}$ columns comprising eigenvectors of R corresponding to $j^{th}$ non-zero eigenvalue of R.

In some embodiments, activity 605 and other activities in method 600 can comprise using a distributed network comprising distributed memory architecture to create an eigenvalue decomposition of a correlation matrix. This distributed architecture can reduce the impact on the network and system resources to reduce congestion in bottlenecks while still allowing data to be accessible from a central location.

In many embodiments, method 600 can comprise an activity 606 of localizing and scaling first data. In some embodiments, first data are localized and scaled using the following equation: $\tilde{x}=(x-\overline{X})D^{-1/2}$, where x is a transaction matrix, $\overline{X}$ is a mean vector, and $D^{-1/2}$ is a diagonal matrix having diagonal entries defined as $$(D^{-1/2})_{j,j} = \frac{1}{\sqrt{D_{j,j}}}.$$

In many embodiments, method 600 can further comprise discovering micro-intents using a localized and scaled matrix. In some embodiments, a primary micro-intent can be defined as $\tilde{x}Q_{,1}$, where $Q_{,1}$ is an eigenvector corresponding to a largest eigenvalue of R. In the same or different embodiments, a secondary micro-intent can be defined as $\tilde{x}Q_{,2}$, where $Q_{,2}$ is an eigenvector corresponding to a second largest eigenvalue of R. In further embodiments, tertiary, quaternary, and other micro-intents can be discovered in the same way.

In some embodiments, activity 606 and other activities in method 600 can comprise using a distributed network comprising distributed memory architecture to localize and scale a data matrix. This distributed architecture can reduce the impact on the network and system resources to reduce congestion in bottlenecks while still allowing data to be accessible from a central location.

Figure 7:
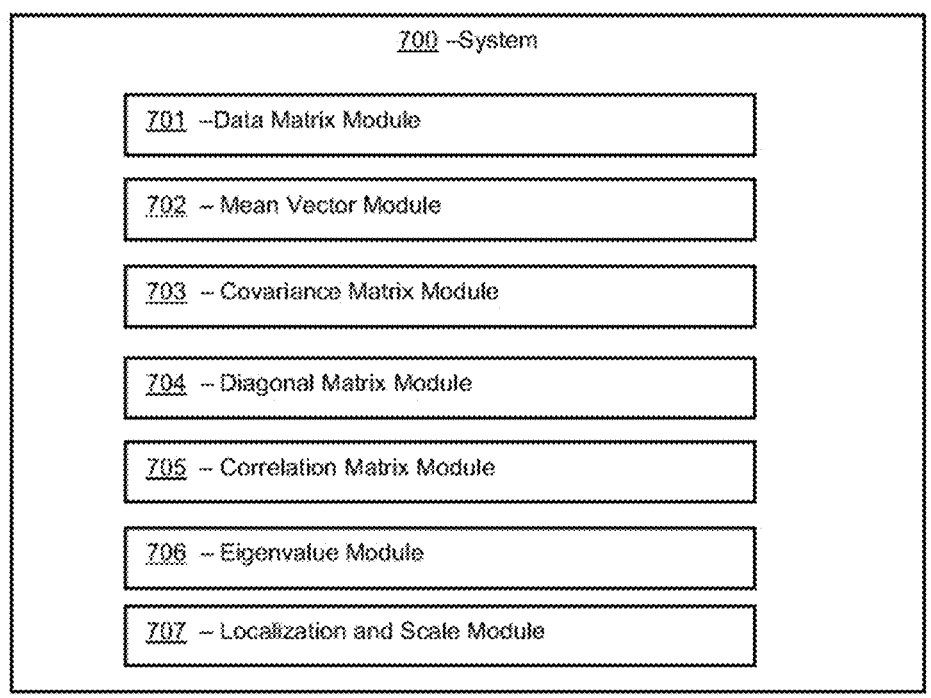
FIG. 7 illustrates a representative block diagram of a system, according to certain embodiments.

Turning ahead in the drawings, FIG. 7 illustrates a block diagram of a system 700 that can be employed to determine micro-intents. System 700 is merely exemplary and embodiments of the system are not limited to the embodiments presented herein. System 700 can be employed in many different embodiments or examples not specifically depicted or described herein. In some embodiments, certain elements or modules of system 700 can perform various procedures, processes, and/or activities. In these or other embodiments, the procedures, processes, and/or activities can be performed by other suitable elements or modules of system 700.

Generally, therefore, system 700 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 700 described herein.

In many embodiments, system 700 can comprise module 701. Module 701 can be referred to as transaction matrix module 701. In many embodiments, data matrix module 701 can store computing instructions configured to run on one or more processing modules and perform one or more acts of method 600 (FIG. 6) (e.g., activity 601 of creating a first data matrix (FIG. 6)).

In many embodiments, system 700 can comprise module 702. Module 702 can be referred to as mean vector module 702. In many embodiments, mean vector module 702 can store computing instructions configured to run on one or more processing modules and perform one or more acts of method 600 (FIG. 6) (e.g., activity 602 of creating a mean vector using a data matrix (FIG. 6)).

In many embodiments, system 700 can comprise module 703. Module 703 can be referred to as covariance matrix module 703. In many embodiments, covariance matrix module 703 can store computing instructions configured to run on one or more processing modules and perform one or more acts of method 600 (FIG. 6) (e.g., activity 603 of creating a covariance matrix using a transaction data matrix (FIG. 6)).

In many embodiments, system 700 can comprise module 704. Module 704 can be referred to as diagonal matrix module 704. In many embodiments, diagonal matrix module 704 can store computing instructions configured to run on one or more processing modules and perform one or more acts of method 600 (FIG. 6) (e.g., activity 604 of creating a diagonal matrix using a covariance matrix (FIG. 6)).

In many embodiments, system 700 can comprise module 705. Module 705 can be referred to as correlation matrix module 705. In many embodiments, correlation matrix module 705 can store computing instructions configured to run on one or more processing modules and perform one or more acts of method 600 (FIG. 6) (e.g., activity 705 of creating a correlation matrix using a diagonal matrix and the covariance matrix (FIG. 6)).

In many embodiments, system 700 can comprise module 706. Module 706 can be referred to as eigenvalue module 706. In many embodiments, eigenvalue module 706 can store computing instructions configured to run on one or more processing modules and perform one or more acts of method 600 (FIG. 6) (e.g., activity 606 of creating an eigenvalue decomposition of a correlation matrix (FIG. 6)).

In many embodiments, system 700 can comprise module 707. Module 707 can be referred to as localization and scale module 707. In many embodiments, localization and scale module 707 can store computing instructions configured to run on one or more processing modules and perform one or more acts of method 600 (FIG. 6) (e.g., activity 607 of localizing and scaling a data matrix (FIG. 6)).

Although systems and methods for identifying and using micro-intents have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions that, when executed on the one or more processors, cause the one or more processors to perform:

accessing, using a distributed network, first transaction data stored in a transaction database, the first transaction data describing first transactions for first items for first users, wherein the transaction database comprises aggregated historical transaction datasets from multiple sources from multiple users, and wherein the distributed network comprises a distributed memory architecture and a distributed processing architecture to reduce congestion from the first transaction data on the distributed network while allowing access to the aggregated historical transaction datasets from another location;

determining, using the distributed processing architecture and using the first transaction data, first micro-intents associated with the first transaction data using a transpose of a matrix comprising the first transaction data and a transpose of a respective mean vector for each item of the first items, wherein the first micro-intents associated with the first transaction data further comprises creating a respective correlation matrix from a respective diagonal matrix for each item of the first items and a respective covariance matrix for each item of the first items;

grouping, using the distributed processing architecture, the first micro-intents into clusters, wherein each of the clusters is created by using:

a first transaction data matrix;

the respective mean vector for each item of the first items;

the respective diagonal matrix for each item of the first items; and a respective eigenvector of respective eigenvectors, wherein the respective eigenvector corresponds to a respective eigenvalue decomposition of the respective correlation matrix, and wherein the respective eigenvalue decomposition of the respective correlation matrix comprises percentages of transformed vectors;

labeling, using the distributed processing architecture, each cluster of the first micro-intents for each of the first transactions with a respective label and a respective label pattern, wherein the respective label pattern comprises a sticky preference when the respective label reoccurs within a history of one of the first users;

receiving, using the distributed memory architecture, second transaction data of a user, the second transaction data describing second transactions for second items for the user;

determining, using the distributed processing architecture and using the second transaction data, second micro-intents present in the second transactions;

receiving, using the distributed memory architecture, current transaction data from a user interface of an electronic device of the user, wherein the current transaction data comprises datasets of a number of items currently added to an electronic shopping cart of the user during a current browsing session of a website;

determining, using the distributed processing architecture and using the current transaction data, third micro-intents present in the current transaction data;

determining, using the distributed processing architecture, that the user is expressing a current micro-intent based on at least one of (i) the first micro-intents, (ii) the second micro-intents, and (iii) the third micro-intents; and transmitting an instruction to display a user interface element on the electronic device of the user, wherein the user interface element is correlated with the current micro-intent of the user.

2. The system of claim 1, wherein determining, using the distributed processing architecture and using the first transaction data, the first micro-intents associated with the first transaction data comprises:

creating the first transaction data matrix using the first transaction data, wherein rows of the first transaction data matrix correspond to transactions of the first transactions and columns of the first transaction data matrix correspond to items of the first items;

creating the respective mean vector for each item of the first items using the first transaction data matrix;

creating the respective covariance matrix using the first transaction data matrix and the respective mean vector for each item of the first items;

creating the respective diagonal matrix for the respective covariance matrix for each item of the first items, wherein diagonals of the respective diagonal matrix for each item of the first items are equal to that of the respective covariance matrix for each item of the first items;

creating the respective eigenvalue decomposition of each of the respective correlation matrixes, wherein columns of the respective eigenvalue decompositions of the respective correlation matrixes are the respective eigenvectors of the respective correlation matrixes, and the respective eigenvectors of the respective correlation matrixes represent the first micro-intents; and localizing and scaling each transaction of the first transactions using the first transaction data matrix, the respective mean vector for each item of the first items, and the respective diagonal matrix for each item of the first items.

3. The system of claim 2, wherein the respective covariance matrix for each item of the first items is created based on:

$$\Sigma = \frac{1}{N} X^T X - \overline{X}^T \overline{X}$$

wherein N is a total number of transactions in X, X is the first transaction data matrix, $X^T$ is a transpose of the first transaction data matrix, $\overline{X}$ is the respective mean vector for each item of the first items, and $\overline{X}^T$ is the transpose of the respective mean vector for each item of the first items.

4. The system of claim 2, wherein each of the respective correlation matrixes is created based on:

$$R = D^{-1/2} \Sigma D^{-1/2}$$

wherein $D^{-1/2}$ is the respective diagonal matrix for each item of the first items and $\Sigma$ is the respective covariance matrix.

5. The system of claim 2, wherein each of the clusters is grouped based on:

$\{x:(x-\bar{X})D^{-1/2}Q_{\cdot j} \in (v_1, v_2)\}$ wherein x is the first transaction data matrix, $\bar{X}$ is the respective mean vector for each item of the first items, $D^{-1/2}$ is the respective diagonal matrix for each item of the first items, $Q_{\cdot j}$ is the respective eigenvector corresponding to the respective eigenvalue decomposition of the respective correlation matrix, $v_1$ is a $25^{th}$ percentile of transformed vectors, and $v_2$ is a $50^{th}$ percentile of the transformed vectors; and wherein grouping the first micro-intents into the clusters comprises comparing similar micro-intents that have differing values.

6. The system of claim 1, wherein:
the computing instructions, when executed on the one or more processors, further cause the one or more processors to perform:
  determining, using the distributed processing architecture and using the first micro-intents for the first transactions, a label pattern for the user,
    wherein the label pattern comprises at least one of:
      a new interest; or
      an evolving preference.

7. The system of claim 1, wherein:
determining, using the distributed processing architecture and using the current transaction data, that the user is expressing the current micro-intent further comprises:
  determining that the current micro-intent is found within a top m micro-intents of k transactions, wherein:
    m and k are configurable by an administrator;
    the second micro-intents comprise the top m micro-intents; and
    the second transactions comprise the k transactions;
the computing instructions, when executed on the one or more processors, further cause the one or more processors to perform:
  applying missed replenishment cycle methods to determine a periodicity of the current micro-intent; and
  transmitting the instruction to display further comprises:
    transmitting the instruction to display, on the user interface of the electronic device, the user interface element only when a period of the current micro-intent is beginning.

8. The system of claim 7, wherein micro-intents in the current transaction data are ordered by a hazard rate.

9. The system of claim 1, wherein:
the computing instructions, when executed on the one or more processors, further cause the one or more processors to perform:
  determining, using the distributed processing architecture, a popular product associated with at least one associated label not in the current transaction data, wherein the user interface element is a product promotion for the popular product.

10. The system of claim 1, wherein labeling, using the distributed processing architecture, each cluster of the first micro-intents further comprises:
  excluding clusters where the label is none.

11. A method being implemented via execution of computing instructions configured to run at one or more processors and configured to be stored at non-transitory computer-readable media, the method comprising:
  accessing, using a distributed network, first transaction data stored in a transaction database, the first transaction data describing first transactions for first items for first users, wherein the transaction database comprises aggregated historical transaction datasets from multiple sources from multiple users, and wherein the distributed network comprises a distributed memory architecture and a distributed processing architecture to reduce congestion from the first transaction data on the distributed network while allowing access to the aggregated historical transaction datasets from another location;
  determining, using the distributed processing architecture and using the first transaction data, first micro-intents associated with the first transaction data using a transpose of a matrix comprising the first transaction data and a transpose of a respective mean vector for each item of the first items, wherein the first micro-intents associated with the first transaction data further comprises creating a respective correlation matrix from a respective diagonal matrix for each item of the first items and a respective covariance matrix for each item of the first items;
  grouping, using the distributed processing architecture, the first micro-intents into clusters, wherein each of the clusters is created by using:
    a first transaction data matrix;
    the respective mean vector for each item of the first items;
    the respective diagonal matrix for each item of the first items; and
    a respective eigenvector of respective eigenvectors, wherein the respective eigenvector corresponds to a respective eigenvalue decomposition of the respective correlation matrix, and wherein the respective eigenvalue decomposition of the respective correlation matrix comprises percentages of transformed vectors;
  labeling, using the distributed processing architecture, each cluster of the first micro-intents for each of the first transactions with a respective label and a respective label pattern, wherein the respective label pattern comprises a sticky preference when the respective label reoccurs within a history of one of the first users;
  receiving, using the distributed memory architecture, second transaction data of a user, the second transaction data describing second transactions for second items for the user;
  determining, using the distributed processing architecture and using the second transaction data, second micro-intents present in the second transactions;
  receiving, using the distributed memory architecture, current transaction data from the user interface of an electronic device of the user, wherein the current transaction data comprises datasets of a number of items currently added to an electronic shopping cart of the user during a current browsing session of a website;
  determining, using the distributed processing architecture and using the current transaction data, third micro-intents present in the current transaction data;
  determining, using the distributed processing architecture, that the user is expressing a current micro-intent based on at least one of (i) the first micro-intents, (ii) the second micro-intents, and (iii) the third micro-intents; and
  transmitting an instruction to display a user interface element on the electronic device of the user, wherein the user interface element is correlated with the current micro-intent of the user.

12. The method of claim 11, wherein determining, using the distributed processing architecture and using the first transaction data, the first micro-intents associated with the first transaction data comprises:
creating the first transaction data matrix using the first transaction data, wherein rows of the first transaction data matrix correspond to transactions of the first transactions and columns of the first transaction data matrix correspond to items of the first items;
creating the respective mean vector for each item of the first items using the first transaction data matrix;
creating the respective covariance matrix using the first transaction data matrix and the respective mean vector for each item of the first items;
creating the respective diagonal matrix for the respective covariance matrix for each item of the first items using the respective covariance matrix, wherein diagonals of the respective diagonal matrix for each item of the first items are equal to that of the respective covariance matrix for each item of the first items;
creating the respective eigenvalue decomposition of each of the respective correlation matrixes, wherein columns of the respective eigenvalue decompositions of the respective correlation matrixes are the respective eigenvectors of the respective correlation matrixes, and the respective eigenvectors of the respective correlation matrixes represent the first micro-intents; and
localizing and scaling each transaction of the first transactions using the first transaction data matrix, the respective mean vector for each item of the first items, and the respective diagonal matrix for each item of the first items.

13. The method of claim 12, wherein the respective covariance matrix for each item of the first items is created based on:

$$\Sigma = \frac{1}{N} X^T X - \overline{X}^T \overline{X}$$

wherein N is a total number of transactions in X, X is the first transaction data matrix, $X^T$ is a transpose of the first transaction data matrix, $\overline{X}$ is the respective mean vector for each item of the first items, and $\overline{X}^T$ is the transpose of the respective mean vector for each item of the first items.

14. The method of claim 12, wherein each of the respective correlation matrixes is created based on:

$$R = D^{-1/2} \Sigma D^{-1/2}$$

wherein $D^{-1/2}$ is the respective diagonal matrix for each item of the first items and $\Sigma$ is the respective covariance matrix.

15. The method of claim 12, wherein the clusters is grouped based on:

$$\{x : (x - \overline{X}) D^{-1/2} Q_{\cdot j} \in (v_1, v_2]\}$$

wherein x is the first transaction data matrix, $\overline{X}$ is the respective mean vector for each item of the first items, $D^{-1/2}$ is the respective diagonal matrix for each item of the first items, $Q_{\cdot j}$ is the respective eigenvector corresponding to the respective eigenvalue decomposition of the respective correlation matrix, $v_1$ is a $25^{th}$ percentile of transformed vectors, and $v_2$ is a $50^{th}$ percentile of the transformed vectors; and
wherein grouping the first micro-intents into the clusters comprises comparing similar micro-intents that have differing values.

16. The method of claim 11, wherein:
the method further comprises:
determining, using the distributed processing architecture and using the first micro-intents for the first transactions, a label pattern for the user,
wherein the label pattern comprises at least one of:
a new interest; or
an evolving preference.

17. The method of claim 11, wherein:
determining, using the distributed processing architecture and using the current transaction data, that the user is expressing the current micro-intent further comprises:
determining that the current micro-intent is found within a top m micro-intents of k transactions, wherein:
m and k are configurable by an administrator;
the second micro-intents comprise the top m micro-intents; and
the second transactions comprise the k transactions;
the method further comprises:
applying missed replenishment cycle methods to determine a periodicity of the current micro-intent; and
transmitting the instruction to display further comprises:
transmitting the instruction to display, on the user interface of the electronic device, the user interface element only when a period of the current micro-intent is beginning.

18. The method of claim 17, wherein micro-intents in the current transaction data are ordered by a hazard rate.

19. The method of claim 11, wherein:
the method further comprises:
determining, using the distributed processing architecture, a popular product associated with at least one associated label not in the current transaction data, wherein the user interface element is a product promotion for the popular product.

20. The method of claim 11, wherein labeling, using the distributed processing architecture, each cluster of the first micro-intents further comprises:
excluding clusters where the label is none.

* * * * *